(12) United States Patent
Eto et al.

(10) Patent No.: US 11,060,570 B1
(45) Date of Patent: Jul. 13, 2021

(54) CLUTCH CONTROL DEVICE

(71) Applicant: NIDEC TOSOK CORPORATION, Kanagawa (JP)

(72) Inventors: Takamitsu Eto, Kanagawa (JP); Fumiya Sagara, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 408 days.

(21) Appl. No.: 16/322,486

(22) PCT Filed: Aug. 2, 2017

(86) PCT No.: PCT/JP2017/027973
§ 371 (c)(1),
(2) Date: Feb. 1, 2019

(87) PCT Pub. No.: WO2018/025891
PCT Pub. Date: Feb. 8, 2018

(30) Foreign Application Priority Data

Aug. 5, 2016 (JP) .............................. JP2016-154852

(51) Int. Cl.
*F16D 48/02* (2006.01)
*F16D 125/02* (2012.01)

(52) U.S. Cl.
CPC ...... *F16D 48/02* (2013.01); *F16D 2048/0221* (2013.01); *F16D 2048/0233* (2013.01);
(Continued)

(58) Field of Classification Search
None
See application file for complete search history.

(56) References Cited

U.S. PATENT DOCUMENTS 9,239,066 B2   1/2016 Sugo et al.
2004/0159523 A1   8/2004 Duan et al.
(Continued)

FOREIGN PATENT DOCUMENTS

CN   102537135   7/2012
DE   112012001692   1/2014
(Continued)

OTHER PUBLICATIONS

"International Search Report (Form PCT/ISA/210)" of PCT/JP2017/027973, dated Nov. 7, 2017, with English translation thereof, pp. 1-4.

*Primary Examiner* — Timothy Hannon
(74) *Attorney, Agent, or Firm* — JCIPRNET

(57) ABSTRACT

The clutch control device comprises: a pump that feeds oil to a hydraulic clutch; a control part that controls the pump; an input-side oil channel through which oil suctioned into the pump from an oil tank passes; an output-side oil channel connecting the pump and the hydraulic clutch; a pressure sensor; a connecting oil channel connected to the input-side oil channel and the output-side oil channel; and a solenoid valve that interrupts or allows the flow of oil in the connecting oil channel. The opening degree of the valve can be adjusted. When a drive shaft and a driven shaft are connected by the hydraulic clutch, the control part adjusts the opening degree of the valve on the basis of the pressure of oil in the output-side oil channel and the number of rotations made by the driven shaft while monotonically increasing the number of rotations of the drive part.

14 Claims, 3 Drawing Sheets

(52) U.S. Cl.
CPC .......... *F16D 2048/0245* (2013.01); *F16D 2125/023* (2013.01); *F16D 2500/1026* (2013.01); *F16D 2500/3024* (2013.01); *F16D 2500/30426* (2013.01); *F16D 2500/50293* (2013.01); *F16D 2500/70406* (2013.01); *F16D 2500/70418* (2013.01)

(56) References Cited

U.S. PATENT DOCUMENTS

| | | |
|---|---|---|
| 2009/0032360 A1 | 2/2009 | Asano |
| 2010/0155192 A1* | 6/2010 | Kohlbock .......... F15B 19/007 192/85.63 |
| 2014/0096852 A1 | 4/2014 | Wi et al. |

FOREIGN PATENT DOCUMENTS

| | | |
|---|---|---|
| JP | S57147401 | 9/1982 |
| JP | H0685901 | 12/1994 |
| JP | H10306775 | 11/1998 |
| JP | 2005282618 | 10/2005 |
| JP | 2006-37991 | 2/2006 |
| JP | 2009079757 | 4/2009 |
| JP | 2014077536 | 5/2014 |

* cited by examiner

CLUTCH CONTROL DEVICE

CROSS-REFERENCE TO RELATED APPLICATION

This application is a 371 of international application of PCT application serial no. PCT/JP2017/027973, filed on Aug. 2, 2017, which claims the priority benefits of Japan application no. 2016-154852, filed on Aug. 5, 2016. The entirety of each of the above-mentioned patent applications is hereby incorporated by reference herein and made a part of this specification.

TECHNICAL FIELD

The present invention relates to a clutch control device.

BACKGROUND ART

For example, Patent Literature 1 discloses a lock-up mechanism having a substantially annular circumferential groove formed in any one of a frictional surface of a lock-up clutch and an engaging surface of a front cover in order to minimize occurrence of judder vibrations.

CITATION LIST

Patent Literature

Patent Literature 1
  Japanese Unexamined Patent Application Publication No. 2006-37991

SUMMARY OF INVENTION

Technical Problem

Incidentally, judder vibrations are generated also by fluctuation of a pressure of oil delivered to a hydraulic clutch by a pump and fluctuation of a force applied to a hydraulic clutch. In the configuration in which circumferential grooves are formed in a frictional surface and an engaging surface as described above, judder vibrations due to pressure fluctuation of oil delivered by a pump cannot be minimized. When judder vibrations occur, for example, in the case in which the hydraulic clutch is mounted on a vehicle, vibrations are transmitted to the vehicle, and comfort of an occupant in the vehicle may be impaired.

In consideration of the above-mentioned problems, one of objectives of the present invention is directed to providing a clutch control device capable of improving comfort of an occupant.

Solution to Problem

An aspect of a clutch control device of the present invention is a clutch control device configured to control a hydraulic clutch that connects a drive shaft and a driven shaft, the clutch control device including: a pump configured to deliver oil to the hydraulic clutch; a control part configured to control a drive part of the pump; an input-side oil channel configured to connect an oil tank and the pump and through which oil suctioned from the oil tank to the pump flows; an output-side oil channel configured to connect the pump and the hydraulic clutch and through which the oil pressurized by the pump and delivered from the pump to the hydraulic clutch flows; a pressure sensor configured to measure a pressure of the oil in the output-side oil channel; a connecting oil channel connected to the input-side oil channel and the output-side oil channel; and a solenoid valve configured to block a flow of the oil in the connecting oil channel in a closed state of the valve and allow a flow of the oil in the connecting oil channel in an open state of the valve, wherein the solenoid valve regulates a flow rate of oil flowing through the connecting oil channel by adjusting an opening degree of the valve, and the control part adjusts the opening degree of the valve on the basis of a pressure of the oil in the output-side oil channel measured by the pressure sensor and a rotational speed of the driven shaft while monotonically increasing the rotational speed of the drive part during a connection period in which the drive shaft and the driven shaft are connected by the hydraulic clutch.

Advantageous Effects of Invention

According to an aspect of the present invention, a clutch control device capable of improving comfort of an occupant is provided.

DESCRIPTION OF EMBODIMENTS

Figure 1:
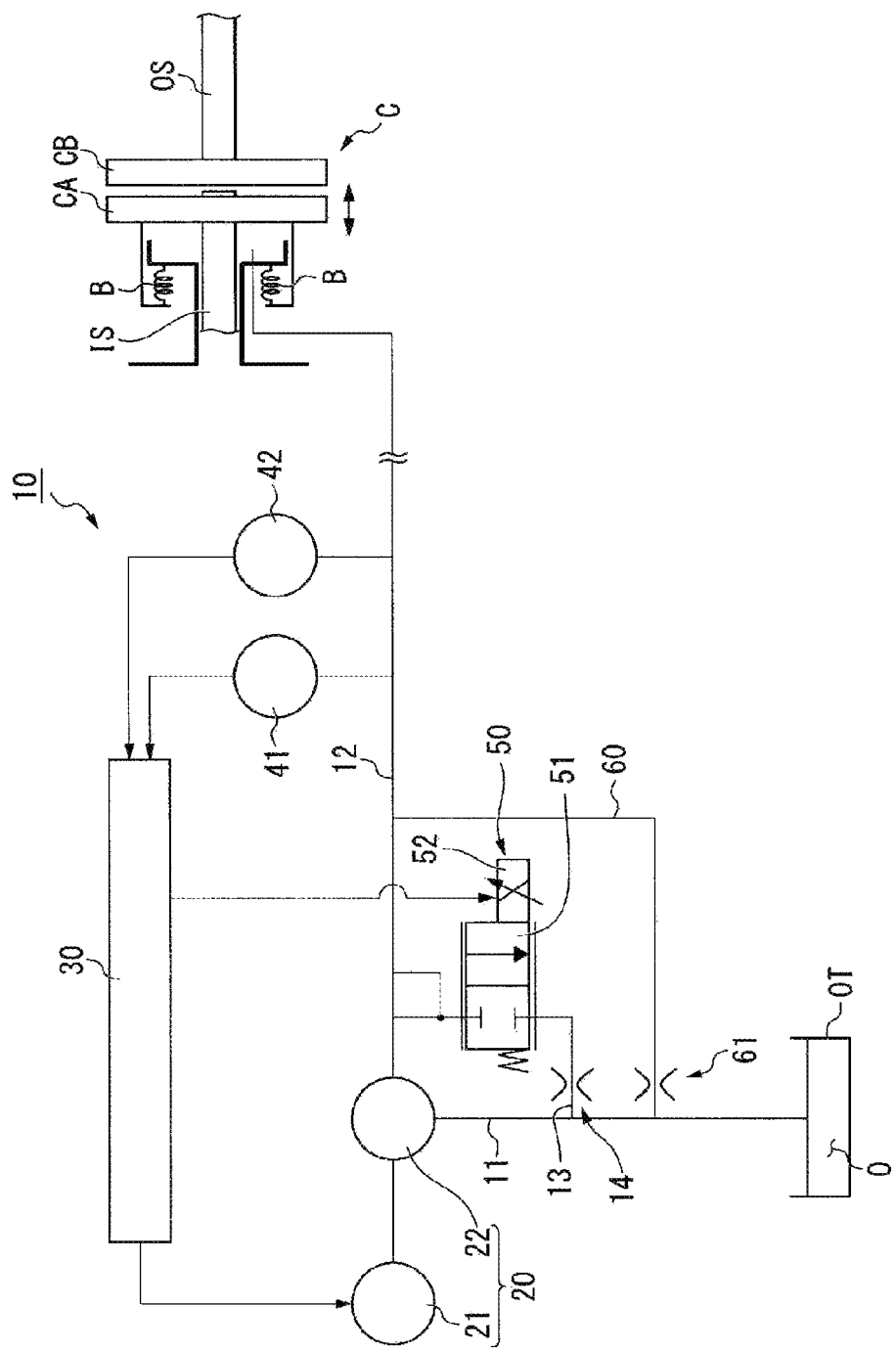
FIG. 1 is a schematic view showing a clutch control device of an embodiment.

As shown in FIG. 1, a clutch control device 10 of the embodiment controls a hydraulic clutch C. The hydraulic clutch C switches between disconnection and connection between a drive shaft IS and a driven shaft OS. That is, the hydraulic clutch C connects the drive shaft IS and the driven shaft OS. FIG. 1 shows a state in which the drive shaft IS and the driven shaft OS are disconnected. The drive shaft IS and the driven shaft OS are concentric with each other. In the following description, a direction parallel to a central axis of the drive shaft IS and a central axis of the driven shaft OS (a leftward/rightward direction in FIG. 1) may be simply referred to as "an axial direction." The hydraulic clutch C is mounted on, for example, a vehicle.

A first clutch plate CA is fixed to the drive shaft IS. A second clutch plate CB is fixed to the driven shaft OS. The first clutch plate CA and the second clutch plate CB are disposed to face each other. The drive shaft IS and the first clutch plate CA are disposed to movable in the axial direction. A force is applied to the first clutch plate CA in a direction in which the first clutch plate CA approaches the second clutch plate CB by the clutch control device 10. Accordingly, the drive shaft IS and the first clutch plate CA move in a direction in which they approach the driven shaft OS and the second clutch plate CB. When the first clutch plate CA moves to be connected to the second clutch plate CB, the drive shaft IS and the driven shaft OS are connected. Accordingly, rotation of the drive shaft IS is transmitted to the driven shaft OS.

A spring B is connected to the first clutch plate CA. The spring B applies a force to the first clutch plate CA in a direction in which the first clutch plate CA separates from the second clutch plate CB. Accordingly, when a force applied to the first clutch plate CA by the clutch control device 10 is smaller than that of the spring B, the first clutch plate CA can be separated from the second clutch plate CB, and the drive shaft IS and the driven shaft OS can be disconnected.

The clutch control device 10 includes a pump 20, an input-side oil channel 11, an output-side oil channel 12, a temperature sensor 41, a pressure sensor 42, a pressure regulation oil channel 60, a connecting oil channel 13, a solenoid valve 50 and a control part 30. The pump 20 delivers oil O to the hydraulic clutch C. The pump 20 has a drive part 21 and a pump part 22. The drive part 21 drives the pump part 22. The drive part 21 is, for example, an electric motor. Further, the drive part 21 may be an engine.

The pump part 22 is disposed between an oil tank OT in which oil O is stored, and the hydraulic clutch C. The pump part 22 is driven by the drive part 21 to pressurize the oil O stored in the oil tank OT and deliver the oil O to the hydraulic clutch C. A configuration of the pump part 22 is not particularly limited as long as the oil O can be delivered. The clutch control device 10 applies a force to the first clutch plate CA in a direction in which the first clutch plate CA approaches the second clutch plate CB in the axial direction using a pressure of the oil O delivered by the pump 20.

The input-side oil channel 11 connects the oil tank OT and the pump 20. More specifically, the input-side oil channel 11 connects the oil tank OT and the pump part 22. The oil O suctioned from the oil tank OT to the pump 20 (the pump part 22) flows through the input-side oil channel 11.

The output-side oil channel 12 connects the pump 20 and the hydraulic clutch C. More specifically, the output-side oil channel 12 connects the pump part 22 and the hydraulic clutch C. The oil O pressurized by the pump 20 and delivered from the pump 20 (the pump part 22) to the hydraulic clutch C flows through the output-side oil channel 12.

The temperature sensor 41 and the pressure sensor 42 are connected to the output-side oil channel 12. The temperature sensor 41 is connected to the output-side oil channel 12 on the side of (upstream from) the pump 20 other than a place to which the pressure sensor 42 is connected. The temperature sensor 41 measures a temperature of the oil O in the output-side oil channel 12. A configuration of the temperature sensor 41 is not particularly limited as long as the temperature of the oil O in the output-side oil channel 12 can be measured. The pressure sensor 42 measures a pressure of the oil O in the output-side oil channel 12. A configuration of the pressure sensor 42 is not particularly limited as long as the pressure of the oil O in the output-side oil channel 12 can be measured.

The pressure regulation oil channel 60 connects the output-side oil channel 12 and the input-side oil channel 11. A place in the output-side oil channel 12 to which the pressure regulation oil channel 60 is connected is on the side of (upstream from) the pump 20 other than places to which the temperature sensor 41 and the pressure sensor 42 are connected. The pressure regulation oil channel 60 has an orifice section 61. The orifice section 61 is a portion of the pressure regulation oil channel 60 having a small cross-sectional area. For this reason, some of the oil O can be discharged from the output-side oil channel 12 while holding the pressure of the oil O in the output-side oil channel 12 at a certain level. Accordingly, an excessive increase in the pressure of the oil O in the output-side oil channel 12 can be minimized, and application of a large load to the drive part 21 can be curbed.

In FIG. 1, the orifice section 61 is disposed on an end portion of the pressure regulation oil channel 60 on the side of the input-side oil channel 11. The orifice section 61 is constituted by, for example, a hole formed in a disk fitted into the pressure regulation oil channel 60. Further, a position of the orifice section 61 in the pressure regulation oil channel 60 is not particularly limited. Further, the pressure regulation oil channel 60 may connect the output-side oil channel 12 and the oil tank OT.

The connecting oil channel 13 is connected to the input-side oil channel 11 and the output-side oil channel 12. A place in the input-side oil channel 11 to which the connecting oil channel 13 is connected is on the side of (downstream from) the pump 20 other than a place to which the pressure regulation oil channel 60 is connected. A place in the output-side oil channel 12 to which the connecting oil channel 13 is connected is on the side of (upstream from) the pump 20 other than a place to which the pressure regulation oil channel 60 is connected. The connecting oil channel 13 has a second orifice section 14. The second orifice section 14 is a portion of the connecting oil channel 13 having a small cross-sectional area. In FIG. 1, the second orifice section 14 is disposed on an end portion of the connecting oil channel 13 on the side of the input-side oil channel 11. The second orifice section 14 is constituted by, for example, a hole formed in a disk fitted into the connecting oil channel 13. Further, a position of the second orifice section 14 in the connecting oil channel 13 is not particularly limited.

The solenoid valve 50 is disposed in the connecting oil channel 13. The solenoid valve 50 has a valve 51 and a solenoid actuator 52. The solenoid valve 50 blocks a flow of the oil O in the connecting oil channel 13 in a closed state of the valve 51 and allows a flow of the oil O in the connecting oil channel 13 in an open state of the valve 51. In FIG. 1, the valve 51 is, for example, a spool valve. The solenoid actuator 52 moves the valve 51 and switches between the closed state and the open state of the valve 51.

The solenoid valve 50 regulates a flow rate of the oil O flowing through the connecting oil channel 13 by adjusting an opening degree OD of the valve 51. The flow rate of the oil O flowing through the connecting oil channel 13 is increased as the opening degree OD of the valve 51 is increased, and the flow rate of the oil O flowing through the connecting oil channel 13 is decreased as the opening degree OD of the valve 51 is decreased. For example, when the valve 51 is a spool valve, an oil channel that constitutes a part of the connecting oil channel 13 is formed in the spool valve. The solenoid valve 50 changes a connection state between a part of the connecting oil channel 13 and the other part of the connecting oil channel 13 formed in the spool valve by moving the spool valve using the solenoid actuator 52 and adjusts a flow rate of the oil O flowing through the connecting oil channel 13. In this case, the opening degree OD of the valve 51 corresponds to a level of a connection state between a part of the connecting oil channel 13 and the other part of the connecting oil channel 13 formed in the spool valve. Specifically, a state in which a part of the connecting oil channel 13 and the other part of the connecting oil channel 13 formed in the spool valve are completely connected is a state in which the opening degree OD of the valve 51 is largest, and a state in which a part of the connecting oil channel 13 and the other part of the connecting oil channel 13 formed in the spool valve are completely disconnected is a state in which the opening degree OD of the valve 51 is smallest. The opening degree OD of the valve 51 is increased as a current I supplied to the solenoid valve 50 (the solenoid actuator 52) is increased. In a state in which the current I is not supplied to the solenoid valve 50 (the solenoid actuator 52), the valve 51 is brought into a closed state.

The control part 30 controls the drive part 21 of the pump 20. The temperature sensor 41 and the pressure sensor 42 are connected to the control part 30, and a measurement result of the temperature sensor 41 and a measurement result of the pressure sensor 42 are input to the control part 30. While not shown, a rotational speed r1 of the drive shaft IS and a rotational speed Ro of the driven shaft OS are input to the control part 30. The control part 30 controls the drive part 21 on the basis of the temperature of the oil O in the output-side oil channel 12 measured by the temperature sensor 41 and the pressure of the oil O in the output-side oil channel 12 measured by the pressure sensor 42. A rotational speed Rm of the drive part 21 can be controlled by the control part 30, and a pressure of the oil O delivered to the hydraulic clutch C by the pump part 22 can be controlled. Further, in the following description, the pressure of the oil O delivered to the hydraulic clutch C by the pump part 22, i.e., the pressure of the oil O in the output-side oil channel 12, is referred to as a clutch pressure P.

The control part 30 controls the solenoid valve 50. More specifically, the control part 30 controls the solenoid actuator 52. The control part 30 controls the solenoid valve 50 (the solenoid actuator 52) and controls the clutch pressure P during a connection period W in which the drive shaft IS and the driven shaft OS are connected.

Figure 2:
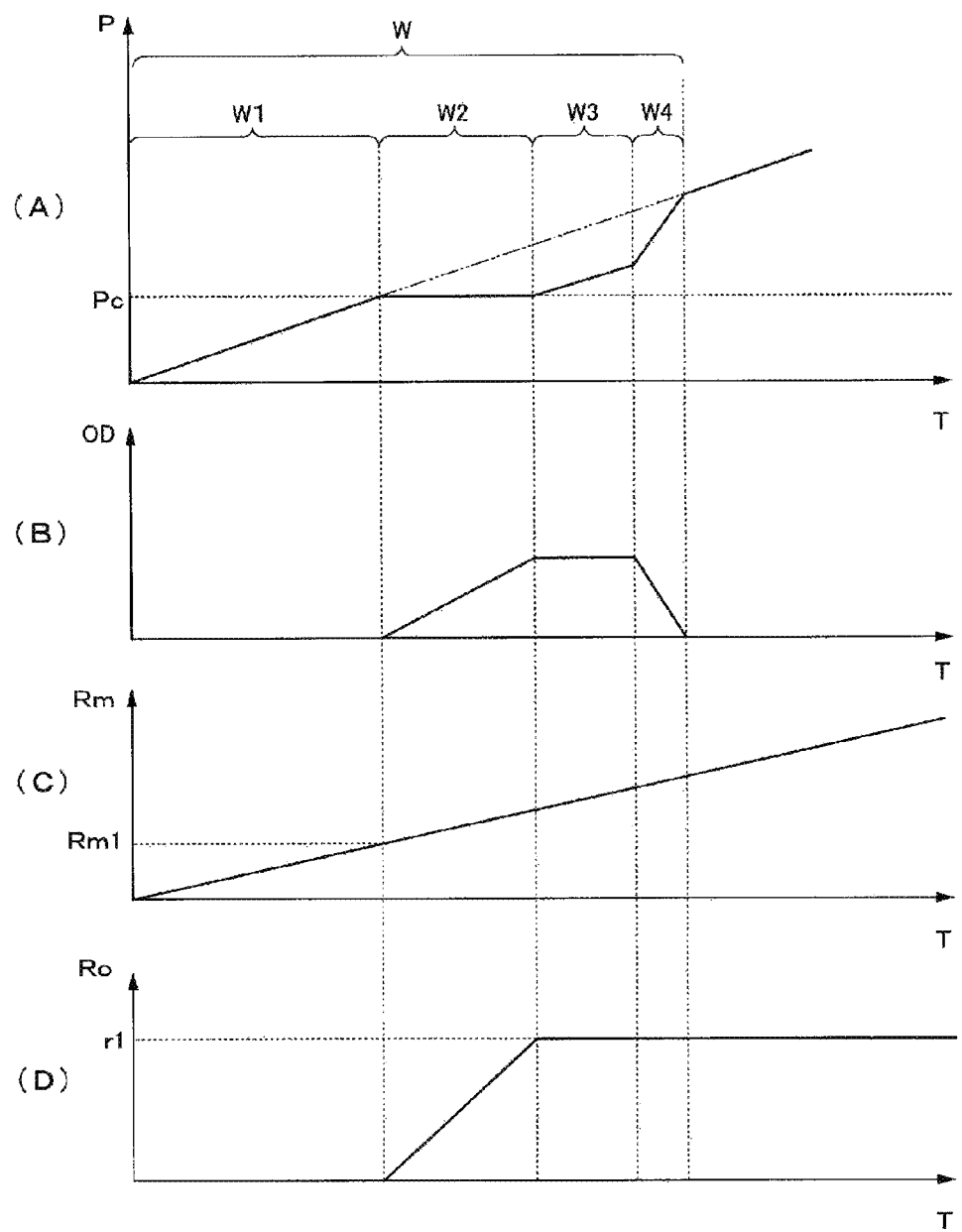
FIG. 2 is a graph showing variations in parameters during a connection period of the embodiment.

As shown in FIG. 2, the connection period W has a clutch pressure increase period W1, a rotational speed adjustment period W2, a clutch pressure regulation period W3 and a closed period W4 in sequence. Graphs in FIG. 2 show examples of variations in parameters during the connection period W. A graph (A) of FIG. 2 is a graph showing a relation between a time T and the clutch pressure P. A graph (B) of FIG. 2 is a graph showing a relation between the time T and the opening degree OD of the valve 51. A graph (C) of FIG. 2 is a graph showing a relation between the time T and the rotational speed Rm of the drive part 21. A graph (D) of FIG. 2 is a graph showing a relation between the time T and the rotational speed Ro of the driven shaft OS.

As shown in the graph (C) of FIG. 2, when the clutch pressure increase period W1 of the connection period W is started, the control part 30 controls the drive part 21 and starts to monotonically increase the rotational speed Rm of the drive part 21. In the graph (C) of FIG. 2, the control part 30 linearly and monotonically increases the rotational speed Rm of the drive part 21. When the rotational speed Rm of the drive part 21 is monotonically increased, since a flow rate of the oil O delivered to the hydraulic clutch C by the pump part 22 is increased, as shown in the graph (A) of FIG. 2, the clutch pressure P is monotonically increased. Accordingly, a force applied to the first clutch plate CA by the oil O is increased, and the first clutch plate CA approaches the second clutch plate CB. In this way, the clutch pressure increase period W1 is a period in which the clutch pressure P is increased.

Figure 3:
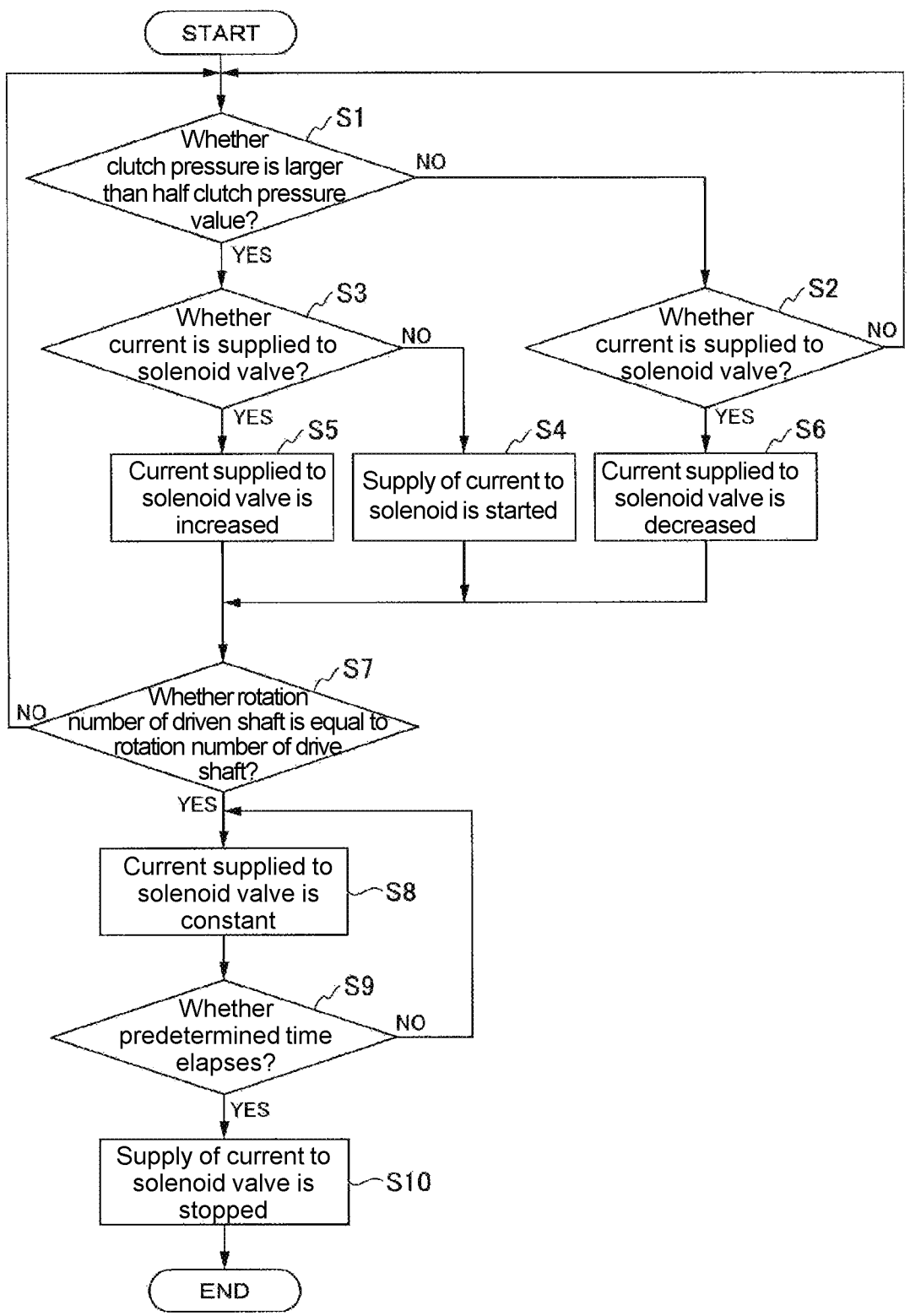
FIG. 3 is a flowchart showing an example of a control procedure of a solenoid valve using the clutch control device of the embodiment.

The control part 30 controls the solenoid valve 50 according to the flowchart shown in FIG. 3 while monotonically increasing the rotational speed Rm of the drive part 21 during the connection period W. Further, immediately after the connection period W, more specifically, immediately after the clutch pressure increase period W1 is started, current is not supplied to the solenoid valve 50, and the valve 51 is brought into a closed state.

As shown in FIG. 3, the control part 30 determines whether the clutch pressure P is larger than a half clutch pressure value Pc (step S1). Here, the half clutch pressure value Pc is a value of the clutch pressure P required to cause the hydraulic clutch C to be brought into a half clutch state. That is, when the clutch pressure P is the half clutch pressure value Pc or more, the first clutch plate CA comes in contact with the second clutch plate CB, and the hydraulic clutch C is brought into a half clutch state. When the clutch pressure P is smaller than the half clutch pressure value Pc (step S1: NO), the control part 30 determines whether current is supplied to the solenoid valve 50 (step S2). Immediately after the connection period W is started, since the current is not supplied to the solenoid valve 50 (step S2: NO), the control part 30 performs determination of whether the clutch pressure P is larger than the half clutch pressure value Pc again (step S1).

When the clutch pressure P is increased to be larger than the half clutch pressure value Pc according to an increase in the rotational speed Rm of the drive part 21 (step S1: YES), the control part 30 determines whether the current is supplied to the solenoid valve 50 (step S3), and when the current is not supplied to the solenoid valve 50 (step S3: NO), the control part 30 starts supply of the current to the solenoid valve 50 (step S4). Accordingly, the clutch pressure increase period W1 is terminated and the rotational speed adjustment period W2 is started. The control part 30 adjusts the opening degree OD of the valve 51 by adjusting the current supplied to the solenoid valve 50 during the rotational speed adjustment period W2, and as shown in the graph (A) of FIG. 2, maintains the clutch pressure P at the half clutch pressure value Pc. That is, the control part 30 maintains the hydraulic clutch C in a half clutch state during the rotational speed adjustment period W2.

When the clutch pressure P is maintained at the half clutch pressure value Pc and the hydraulic clutch C is brought into a half clutch state, rotation of the drive shaft IS is transmitted to the driven shaft OS as the first clutch plate CA comes in contact with the second clutch plate CB. Accordingly, as shown in the graph (D) of FIG. 2, when the rotational speed adjustment period W2 is started, the rotational speed Ro of the driven shaft OS starts to increase. The rotational speed adjustment period W2 continues until the rotational speed Ro of the driven shaft OS is equal to the rotational speed r1 of the drive shaft IS. That is, as shown in FIG. 3, the control part 30 determines whether the rotational speed Ro of the driven shaft OS is equal to the rotational speed r1 of the drive shaft IS (step S7), and when the rotational speed Ro of the driven shaft OS does not reach the rotational speed r1 of the drive shaft IS (step S7: NO), the control part 30 maintains the clutch pressure P at the half clutch pressure value Pc.

When current is supplied to the solenoid valve 50, since the oil O flows from the output-side oil channel 12 to the input-side oil channel 11 via the connecting oil channel 13, the clutch pressure P is decreased. Meanwhile, since the rotational speed Rin of the drive part 21 continues to monotonically increase, when current supplied to the solenoid valve 50 does not vary, the clutch pressure P is increased. During the rotational speed adjustment period W2, the control part 30 performs feedback control on the basis of the clutch pressure P measured by the pressure sensor 42, and maintains the clutch pressure P at the half clutch pressure value Pc.

As shown in FIG. 3, the control part 30 reduces current supplied to the solenoid valve 50 (step S6) when the clutch pressure P is smaller than the half clutch pressure value Pc (step S1: NO, step S2: YES) during the rotational speed adjustment period W2. Accordingly, the opening degree OD of the valve 51 is decreased, and the clutch pressure P is increased.

Meanwhile, the control part 30 increases current supplied to the solenoid valve 50 (step S5) when the clutch pressure P is larger than the half clutch pressure value Pc (step S1: YES, step S3: YES) during the rotational speed adjustment period W2. Accordingly, the opening degree OD of the valve 51 is increased and the clutch pressure P is decreased. As a result, the clutch pressure P is maintained at the half clutch pressure value Pc during the rotational speed adjustment period W2.

As described above, since the rotational speed Rm of the drive part 21 continues to monotonically increase, when current supplied to the solenoid valve 50 does not vary, the clutch pressure P monotonically increases. Accordingly, when the clutch pressure P is maintained at the half clutch pressure value Pc, as shown in the graph (B) of FIG. 2, the opening degree OD of the valve 51 monotonically increases during the rotational speed adjustment period W2.

As shown in FIG. 3, when the rotational speed Ro of the driven shaft OS is equal to the rotational speed r1 of the drive shaft IS (step S7: YES), the control part 30 makes the current supplied to the solenoid valve 50 constant (step S8). Accordingly, the rotational speed adjustment period W2 is terminated, and the clutch pressure regulation period W3 shown in FIG. 2 is started. That is, the rotational speed adjustment period W2 is a period until the rotational speed Ro of the driven shaft OS is equal to the rotational speed r1 of the drive shaft IS after the first clutch plate CA and the second clutch plate CB come in contact with each other, i.e., the drive shaft IS and the driven shaft OS come in contact with each other. Further, the rotational speed Ro of the driven shaft OS is maintained at the rotational speed r1 of the drive shaft IS after it becomes equal to the rotational speed r1 of the drive shaft IS.

During the clutch pressure regulation period W3, since the current supplied to the solenoid valve 50 becomes constant, as shown in the graph (B) of FIG. 2, the opening degree OD of the valve 51 becomes constant. Meanwhile, as shown in the graph (C) of FIG. 2, since the rotational speed Rm of the drive part 21 monotonically increases also during the clutch pressure regulation period W3, as shown in the graph (A) of FIG. 2, the clutch pressure P monotonically increases during the clutch pressure regulation period W3.

Then, as shown in FIG. 3, the control part 30 stops supply of current to the solenoid valve 50 (step S10) after a predetermined time elapses (step S9: YES). Accordingly, the clutch pressure regulation period W3 is terminated and the closed period W4 is started. As shown in the graphs (A) and (B) of FIG. 2, during the closed period W4, the opening degree OD of the valve 51 is decreased and the clutch pressure P is increased. The closed period W4 is a period until the valve 51 is brought into a closed state after supply of the current to the solenoid valve 50 is stopped. Since the valve 51 is brought into the closed state, the clutch pressure P reaches a pressure at which the drive shaft IS and the driven shaft OS are connected, and the drive shaft IS and the driven shaft OS are connected. Accordingly, the connection period W is terminated.

When the pump part 22 is driven by the drive part 21, the oil O delivered by the pump part 22, i.e., the oil O in the output-side oil channel 12 is vibrated due to rotation of the drive part 21, and the pressure of the oil O is periodically fluctuated. In this state, when the first clutch plate CA and the second clutch plate CB come in contact with each other, a force applied to the first clutch plate CA by the oil O is fluctuated, and judder vibrations occur. In the case of the judder vibrations occurred due to such rotation of the drive part 21, when the rotational speed Rm of the drive part 21 is increased and the hydraulic clutch C starts to be brought into a half clutch state, the rotational speed Rm of the drive part 21 is likely to generate vibrations for humans uncomfortable, and comfort of an occupant in the vehicle may be impaired. In the following description, the rotational speed Rm of the drive part 21 when the hydraulic clutch C starts to be brought into a half clutch state is referred to as a half clutch rotational speed Rm1. The half clutch rotational speed Rm1 is about 400 rpm, and a frequency of the judder vibrations occurred at this time is about 6 Hz or more and 7 Hz or less. As shown in the graph (C) of FIG. 2, the half clutch rotational speed Rm1 is the rotational speed Rm of the drive part 21 when the rotational speed adjustment period W2 is started. Further, since the frequency of the judder vibrations becomes greater as the rotational speed Rm of the drive part 21 is larger than the half clutch rotational speed Rm1, the judder vibrations are less likely to be uncomfortable for humans.

According to the embodiment, as described above, the control part 30 adjusts the opening degree OD of the valve 51 on the basis of the pressure (the clutch pressure P) of the oil O in the output-side oil channel 12 measured by the pressure sensor 42 and the rotational speed Ro of the driven shaft OS while monotonically increasing the rotational speed Rm of the drive part 21 during the connection period W in which the drive shaft IS and the driven shaft OS are connected by the hydraulic clutch C. For this reason, the opening degree OD of the valve 51 can be adjusted and the clutch pressure P can be maintained at the half clutch pressure value Pc while the rotational speed Rm of the drive part 21 is larger than the half clutch rotational speed Rm1. Accordingly, the half clutch state can be maintained with the rotational speed Rm of the drive part 21, at which the occurred judder vibrations do not make people uncomfortable. Accordingly, when the drive shaft IS and the driven shaft OS are connected by the hydraulic clutch C, comfort of an occupant in the vehicle can be improved.

In addition, according to the embodiment, the control part 30 makes the valve 51 open during the rotational speed adjustment period W2, and the clutch pressure P is maintained at the half clutch pressure value Pc where the hydraulic clutch C is brought into a half clutch state. For this reason, the hydraulic clutch C can be maintained in a half clutch state while monotonically increasing the rotational speed Rm of the drive part 21.

In addition, in the embodiment, the control part 30 monotonically increases the opening degree OD of the valve 51 during the rotational speed adjustment period W2. For this reason, the clutch pressure P, which should also monotonically increase like a two-dot chain line in the graph (A) of FIG. 2 can be maintained at the half clutch pressure value Pc due to monotonous increase in the rotational speed Rm of the drive part 21.

In addition, the control part 30 makes the valve 51 closed during the closed period W4 after the rotational speed adjustment period W2, and the clutch pressure P has a pressure value at which the drive shaft IS and the driven shaft OS are connected. For example, since the clutch pressure P is increased also during the clutch pressure regulation period W3, the clutch pressure P can have the pressure value at which the drive shaft IS and the driven shaft OS are connected while the valve 51 is in an open state. However, since the valve 51 is in the closed state, as shown in the graph (A) of FIG. 2, the clutch pressure P can more rapidly reach the pressure value at which the drive shaft IS and the driven shaft OS are connected, and the drive shaft IS and the driven shaft OS can be connected rapidly.

In addition, according to the embodiment, the control part 30 keeps the opening degree OD of the valve 51 constant for a predetermined time after the rotational speed adjustment period W2 and before the valve 51 is in the closed state. In the embodiment, during the clutch pressure regulation period W3 between the rotational speed adjustment period W2 and the closed period W4, the control part 30 maintains the opening degree OD of the valve 51 constantly for a predetermined time. For this reason, after the rotational speed adjustment period W2, the clutch pressure P can be gradually increased, and the drive shaft IS and the driven shaft OS can be smoothly connected.

Further, the clutch pressure regulation period W3 and the closed period W4 may not be provided.

In addition, types of the hydraulic clutch to which the clutch control device of the above-mentioned embodiment is applied are not particularly limited, and the clutch control device may be applied to any type of hydraulic clutch. In addition, the hydraulic clutch is not limited to a hydraulic clutch mounted on a vehicle.

In addition, the above-mentioned components can be appropriately combined within a range in which they are not mutually inconsistent.

The invention claimed is:

1. A clutch control device configured to control a hydraulic clutch that connects a drive shaft and a driven shaft, the clutch control device comprising:
   a pump configured to deliver oil to the hydraulic clutch;
   a control part configured to control a drive part of the pump;
   an input-side oil channel configured to connect an oil tank and the pump and through which oil suctioned from the oil tank to the pump flows;
   an output-side oil channel configured to connect the pump and the hydraulic clutch and through which the oil pressurized by the pump and delivered from the pump to the hydraulic clutch flows;
   a pressure sensor configured to measure a pressure of the oil in the output-side oil channel;
   a connecting oil channel connected to the input-side oil channel and the output-side oil channel; and
   a solenoid valve configured to block a flow of the oil in the connecting oil channel in a closed state of a valve and allow a flow of the oil in the connecting oil channel in an open state of the valve,
   wherein the solenoid valve regulates a flow rate of oil flowing through the connecting oil channel by adjusting an opening degree of the valve, and
   the control part adjusts the opening degree of the valve on the basis of a pressure of the oil in the output-side oil channel measured by the pressure sensor and a rotational speed of the driven shaft while monotonically increasing the rotational speed of the drive part during a connection period in which the drive shaft and the driven shaft are connected by the hydraulic clutch.

2. The clutch control device according to claim 1, further comprising a pressure regulation oil channel configured to connect the output-side oil channel and the oil tank or connect the output-side oil channel and the input-side oil channel,
   wherein the pressure regulation oil channel has an orifice section of the pressure regulation oil channel having a small cross-sectional area.

3. The clutch control device according to claim 1, wherein the connection period has a rotational speed adjustment period until a rotational speed of the driven shaft is equal to a rotational speed of the drive shaft after the drive shaft and the driven shaft come in contact with each other, and
   the control part brings the valve into an open state and maintains a pressure of the oil in the output-side oil channel at a half clutch pressure value at which the hydraulic clutch is brought into a half clutch state during the rotational speed adjustment period.

4. The clutch control device according to claim 3, further comprising a pressure regulation oil channel configured to connect the output-side oil channel and the oil tank or connect the output-side oil channel and the input-side oil channel,
   wherein the pressure regulation oil channel has an orifice section of the pressure regulation oil channel having a small cross-sectional area.

5. The clutch control device according to claim 3, wherein the control part brings the valve into the closed state and maintains a pressure of the oil in the output-side oil channel at a pressure value at which the drive shaft and the driven shaft are connected after the rotational speed adjustment period.

6. The clutch control device according to claim 5, further comprising a pressure regulation oil channel configured to connect the output-side oil channel and the oil tank or connect the output-side oil channel and the input-side oil channel,
   wherein the pressure regulation oil channel has an orifice section of the pressure regulation oil channel having a small cross-sectional area.

7. The clutch control device according to claim 5, wherein the control part maintains a constant opening degree of the valve for a predetermined time after the rotational speed adjustment period and before the valve is in the closed state.

8. The clutch control device according to claim 7, further comprising a pressure regulation oil channel configured to connect the output-side oil channel and the oil tank or connect the output-side oil channel and the input-side oil channel,
   wherein the pressure regulation oil channel has an orifice section of the pressure regulation oil channel having a small cross-sectional area.

9. The clutch control device according to claim 3, wherein the control part monotonically increases the opening degree of the valve during the rotational speed adjustment period.

10. The clutch control device according to claim 9, further comprising a pressure regulation oil channel configured to connect the output-side oil channel and the oil tank or connect the output-side oil channel and the input-side oil channel,
    wherein the pressure regulation oil channel has an orifice section of the pressure regulation oil channel having a small cross-sectional area.

11. The clutch control device according to claim 9, wherein the control part brings the valve into the closed state and maintains a pressure of the oil in the output-side oil channel at a pressure value at which the drive shaft and the driven shaft are connected after the rotational speed adjustment period.

12. The clutch control device according to claim 11, further comprising a pressure regulation oil channel configured to connect the output-side oil channel and the oil tank or connect the output-side oil channel and the input-side oil channel, wherein the pressure regulation oil channel has an orifice section of the pressure regulation oil channel having a small cross-sectional area.

13. The clutch control device according to claim 11, wherein the control part maintains a constant opening degree of the valve for a predetermined time after the rotational speed adjustment period and before the valve is in the closed state.

14. The clutch control device according to claim 13, further comprising a pressure regulation oil channel configured to connect the output-side oil channel and the oil tank or connect the output-side oil channel and the input-side oil channel, wherein the pressure regulation oil channel has an orifice section of the pressure regulation oil channel having a small cross-sectional area.

* * * * *